Patented Aug. 5, 1952

2,606,205

UNITED STATES PATENT OFFICE 2,606,205

DIHALOGEN BENZOIC ACID ESTERS OF AMINO ALCOHOLS

Robert S. Shelton, Mariemont, and Edwin R. Andrews, Silverton, Ohio, assignors to The Wm. S. Merrell Company, Cincinnati, Ohio, a corporation of Delaware No Drawing. Application July 9, 1946, Serial No. 682,305

2 Claims. (Cl. 260—477)

This invention relates to certain new esters of di-halogen-substituted benzoic acids and nitrogen base alcohols, which display valuable anesthetic properties.

The clinical value of a potent anesthetic is largely determined by its relative freedom from toxic and irritating side effects. The new esters possess a high order of potency, in general about equal to that of procaine, but have a very considerably lower intravenous toxicity as a class. Individually, they exhibit toxicities as low as one-fifth that of procaine. These new anesthetics are particularly valuable for intravenous injection to relieve pain due to cancer, large burned areas, extensive bruises and tissue damages such as may be incurred in automobile accidents, as well as in other cases where a minimum of irritating side reaction is desirable. They are useful as peripheral analgesics, central analgesics and as cardiac nerve depressants to control certain cardiac irregularities, such as ventricular fibrillation.

The new compounds are esters of dihalogen benzoic acids with nitrogen base alcohols, i. e., amino or quaternary ammonium alcohols. The nitrogen base alcohols which are esterified to produce the new compounds of the invention include a wide range of amino alcohols, including primary, secondary and tertiary amino alcohols and quaternary ammonium alcohols. Included are the amino alcohols in which one or more of the hydrogens of ammonia is replaced by one or more alkyl or substituted alkyl groups, or alicyclic groups, including those in which the nitrogen forms part of a heterocyclic ring structure as, for example, in piperidine and morpholine. The nitrogen base alcohol may contain more than one basic nitrogen group and more than one hydroxy group but at least one amino or quaternary ammonium group and one hydroxyl group are necessary.

This invention includes the new compounds both in the form of free bases and in the form of acid addition salts. Normally, the compounds are prepared in the form of their salts, but the free esters are readily obtained by treatment with an alkali such as sodium carbonate in the usual manner. In general, for therapeutic purposes, the compounds will be administered in the form of their salts, most commonly in the form of hydrochlorides, although they may be used in the form of the borate, sulphate, nitrate, tartrate, phosphate, glycolate, levulinate, etc.

The new compounds may be readily prepared in the form of the hydrochloride salt by reacting nitrogen base alcohol with the selected di-halogenobenzoyl chloride in benzene solution. Upon the addition of the halogen substituted benzoyl chloride a moderate evolution of heat occurs. The mixture is then refluxed for a period of from 6 to 16 hours. Where the simpler amino compounds are concerned, the hydrochloride salts of the amine esters are normally insoluble in the hot benzene solution, and separate as voluminous white precipitates. The precipitates are removed from the cooled mixture by filtration with suction, washed with ether and re-crystallized from a mixture of absolute alcohol and ether. The hydrochloride salts of the esters of the higher amino alcohols are, in general, soluble in hot benzene and are isolated by distilling off the bulk of the benzene and diluting the residue with ether. The resulting precipitates are then separated by filtration, washed with ether and re-crystallized from ethyl acetate or from a mixture of ethyl acetate and ether.

The hydrochloride salts are obtained in good yields of from 69 to 93% of theoretical. They are, in general, white crystalline solids, soluble in water, and exhibit sharp melting points.

The production of the new compounds of this invention will be illustrated by the following examples but the invention is not limited thereto:

*Example I.—β-Diethylaminoethyl 2,4-dichlorobenzoate hydrochloride*

One-tenth mole of β-diethylaminoethanol is dissolved in 300 ml. of anhydrous benzene, and slightly more than one-tenth mole of 2,4-dichlorobenzoyl chloride is added. This mixture is heated under reflux on a steam bath for 6 hours. The hydrochloride of the alkamine ester separates from the hot benzene solution as a voluminous white precipitate. After cooling the mixture, the precipitate is removed by filtration under suction, washed and dried. The crude β-diethylaminoethyl 2,4-dichlorobenzoate hydrochloride is re-crystallized from a mixture of absolute alcohol (100 ml.) and ether (300 ml.) as a white powder (M. P. 131–132° C.). The corresponding diisobutylaminoethyl compound melts at 105–107° C.

*Example II.—β-Diethylaminoethyl 2,4-dibromobenzoate hydrochloride*

One-tenth mole of β-diethylaminoethanol is dissolved in 300 ml. of anhydrous benzene, and slightly more than one-tenth mole of 2,4-dibromobenzoyl chloride is added. The mixture is heated under reflux on a steam bath for 8 hours.

The hydrochloride salt of the β-diethylaminoethyl 2,4-dibromobenzoate separates and is recovered according to the method of Example I.

*Example III.—β-Diisobutylaminoethyl 3,4-dichlorobenzoate hydrochloride*

One-tenth mole of β-diisobutylaminoethanol is dissolved in 300 ml. of anhydrous benzene, and slightly more than one-tenth mole of 3,4-dichlorobenzoyl chloride is added. The solution is heated under reflux for 10 hours. The soluble hydrochloride salt does not separate from the hot benzene solution. All but 50 ml. of the benzene is removed by distillation on a steam bath, and the residue is diluted with about 300 ml. of ether. The hydrochloride salt now separates as a voluminous white precipitate which is removed by filtration under suction, washed with ether and dried. The crude material is re-crystallized from a mixture of ethyl acetate (about 175 ml.), and ether (about 100 ml.) in the form of white needles (M. P. 149–150° C.).

Included among the nitrogen base alcohols which may be esterified to produce esters of dihalogenobenzoic acids of the invention are:

Diethylaminoethanol
Dimethylaminoethanol
Ethylaminoethanol
Diethylaminobutanol
β-Isopropylaminoethanol
β-Isobutylaminoethanol
3-isopropylaminopropanol
β-Ethylaminoisopropanol
β-Isopropylaminoisopropanol
Propanolamine
Ethanolamine
1-piperidino-2-hydroxy-propane
1-piperidino-2-phenylurethan-3-hydroxy-propane
1,3-bis-diethylamino-2-hydroxy-propane
4-hydroxy-3,4-dimethyleneoxy-oxazolidine
β,β',β''-Trihydroxytertiarybutylamine
Isopropylaminoethanol
Dimethylaminocyclohexanol
Diethylaminocyclophentanol
4-hydroxypiperidine as well as quaternary ammonium compounds corresponding to tertiary amino alcohols, but with the nitrogen further substituted, as by an alkyl, alicyclic, or aralkyl group, as represented by the following examples, named in terms of their cations:

Triethylammoniumethanol
Diethylammoniumethanol
Ethyldimethylammoniumethanol
1-(methylpiperidinium)-2-hydroxy-propane
Ethyldimethylammoniumcyclohexanol
Diethylcyclohexylammoniumethanol
Benzyldiethylammoniumethanol
Phenyldimethylammoniumethanol The dihalogeno acids which are combined with the nitrogen base alcohols to produce the new compounds of the invention by the procedures of the examples include:

2,4-dichlorobenzoic acid
3,4-dichlorobenzoic acid
2,5-dichlorobenzoic acid
2,6-dichlorobenzoic acid
3,5-dichlorobenzoic acid and the corresponding dibromo and diiodo benzoic acids.

We claim:
1. Compounds of the formula

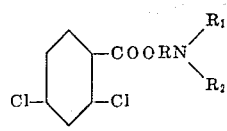

in which R is a divalent, acyclic saturated hydrocarbon group having 2 to 5 carbon atoms, and $R_1$ and $R_2$ are selected from the group consisting of saturated acyclic hydrocarbon groups having 1 to 4 carbon atoms and, taken together, pentamethylene.

2. β-diethylaminoethyl, 2,4-dichlorobenzoate.

ROBERT S. SHELTON.
EDWIN R. ANDREWS.

REFERENCES CITED

The following references are of record in the file of this patent:

FOREIGN PATENTS

| Number | Country | Date |
|---|---|---|
| 321,968 | Great Britain | Nov. 25, 1929 |

OTHER REFERENCES

Rohrmann et al.: "Chem. Abstracts," vol 37 (1943) pp. 5708.

Jenkins et al.: "Chemistry of Organic Medicinal Products," 2nd ed. (1941) pp. 336–344, John Wiley and Sons, London.

Rubin et al.: J. A. C. S., vol. 68, pp. 623–624 (1946).

Campaigne et al.: Chemical Abstracts, vol. 35, p. 2214 (1941).